W. S. LUCKETT.
CIGAR MACHINE.
APPLICATION FILED MAY 31, 1906.

1,004,800.

Patented Oct. 3, 1911.
8 SHEETS—SHEET 1.

Fig. 1

Attest
L. White
Philip N. Tilden.

Inventor
William S. Luckett
by his Atty's:
Philipp, Sewyn, Rice & Kennedy

W. S. LUCKETT.
CIGAR MACHINE.
APPLICATION FILED MAY 31, 1906.

1,004,800.

Patented Oct. 3, 1911.
8 SHEETS—SHEET 2.

Attest
A. White
Philip N. Tilden

Inventor
William S. Luckett
By his Attys:
Philipp, Sawyer, Rice & Kennedy

W. S. LUCKETT.
CIGAR MACHINE.
APPLICATION FILED MAY 31, 1906.

1,004,800.

Patented Oct. 3, 1911.

W. S. LUCKETT.
CIGAR MACHINE.
APPLICATION FILED MAY 31, 1906.

1,004,800.

Patented Oct. 3, 1911.
8 SHEETS—SHEET 4.

W. S. LUCKETT.
CIGAR MACHINE.
APPLICATION FILED MAY 31, 1906.

1,004,800.

Patented Oct. 3, 1911.
8 SHEETS—SHEET 6.

Attest
A. White
Philip N. Tilden.

Inventor
William S. Luckett
By his Attys

UNITED STATES PATENT OFFICE.

WILLIAM S. LUCKETT, OF EAST ORANGE, NEW JERSEY, ASSIGNOR TO INTERNATIONAL CIGAR MACHINERY COMPANY, OF NEW YORK, N. Y., A CORPORATION OF NEW JERSEY.

CIGAR-MACHINE.

1,004,800.      Specification of Letters Patent.      Patented Oct. 3, 1911.

Application filed May 31, 1906. Serial No. 319,413.

*To all whom it may concern:*

Be it known that I, WILLIAM S. LUCKETT, a citizen of the United States, residing at East Orange, county of Essex, and State of New Jersey, have invented certain new and useful Improvements in Cigar-Machines, fully described and represented in the following specification and the accompanying drawings, forming a part of the same.

This invention relates to certain improvements in cigar machines.

One of the objects of the invention is to produce an improved mechanism for preparing filler for cigar machines.

A further object of the invention is to produce an improved mechanism by which sections of the filler after being prepared are transferred to a rolling mechanism.

A further object of the invention is to produce an improved mechanism for delivering binders to the rolling mechanism.

A further object of the invention is to produce an improved mechanism for trimming the cigar bunches after rolling.

With these and other objects in view, the invention consists in certain constructions and in certain parts, improvements and combinations as will be hereinafter fully described and then specifically pointed out.

Referring to the drawings Fig. 17 is a side elevation illustrating certain features of the rolling mechanism.

In the machine selected to illustrate the invention, the filler is prepared by first cutting the filler leaves into different lengths and then bringing together or assembling the lengths, the purpose being, in this particular machine, to prepare a mass of filler having such dimensions that sections can be separated therefrom, these sections having the proper quantity of tobacco therein to form a cigar bunch of the desired shape.

While the cutting mechanism employed for separating the tobacco filler into different lengths may be widely varied and will be varied in accordance with the character of the machine in which the invention is embodied, in the particular construction illustrated, the cutting mechanism is of the rotary form. The number of knives employed in the cutting mechanism will also vary according to the number of different sections it is desired to cut and assemble, and the configuration of the knives may also be varied.

In the construction illustrated, there is employed a cutting roll, this roll being mounted on a shaft 2 journaled in suitable bearings 3 in the frame of the machine. This shaft carries three cutting knives 4, 5 and 6, the knives being arranged to cut the filler into three sections, which sections are to be afterward assembled. Coöperating with the knives are a series of rotary cutting abutments in the form of collars 7, 8 and 9, these collars being mounted on a shaft 10 suitably journaled in bearings 11 formed in the frame of the machine. In the particular construction illustrated, means are provided for presenting the tobacco to the cutting mechanism. In the best constructions, these means will be arranged as shown to present the leaves sidewise to the cutting mechanism, that is, so that the cut will take place across the midrib or stem of the leaf. As illustrated, the means for presenting the leaves to the cutters consists of three belts 12, these belts passing around pulleys on the shaft 1 and around other pulleys 13 carried on bracket arms 14. These arms are loosely supported on hubs on the shaft 1. A feeding table, as 15, may be provided with which the belts coöperate, the necessary pressure on the table being obtained from the weight of the arms 14 and the pulleys. As shown, the knives are formed to present salient and reëntrant angles, this construction notching out the edges of the filler lengths cut by the knives in a manner well understood in the art, so that the ends of the bunches formed from the filler may be properly shaped.

Figure 1:
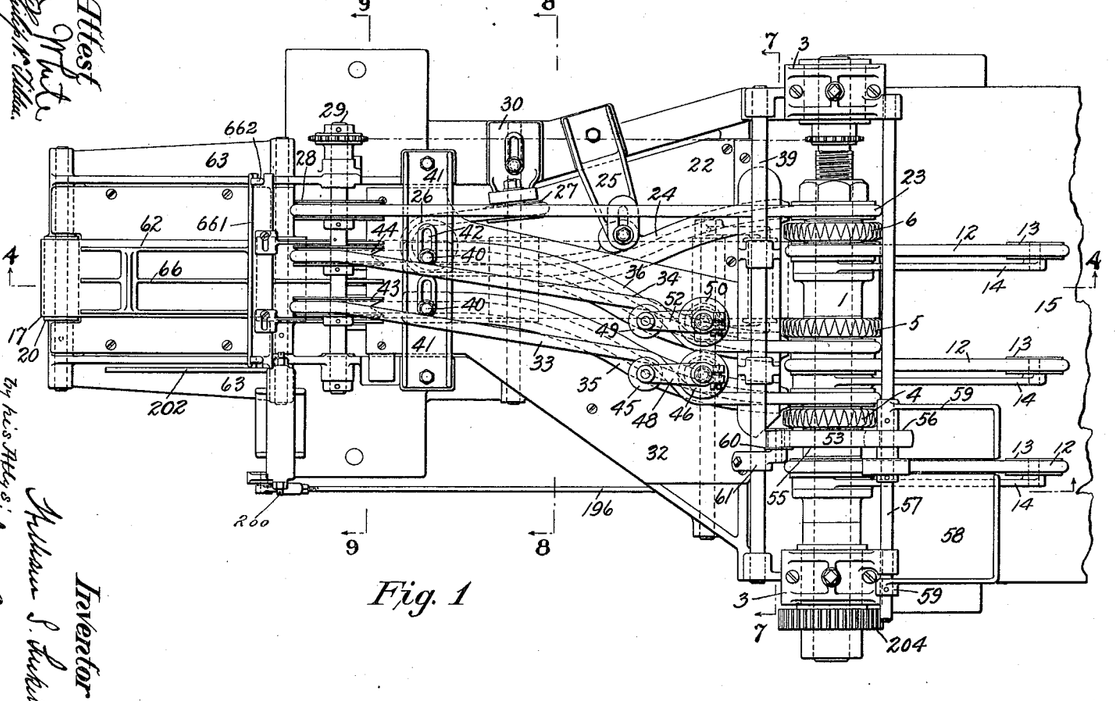
—Figure 1 is a plan view of a mechanism embodying the improved filler feed.
Figure 3:
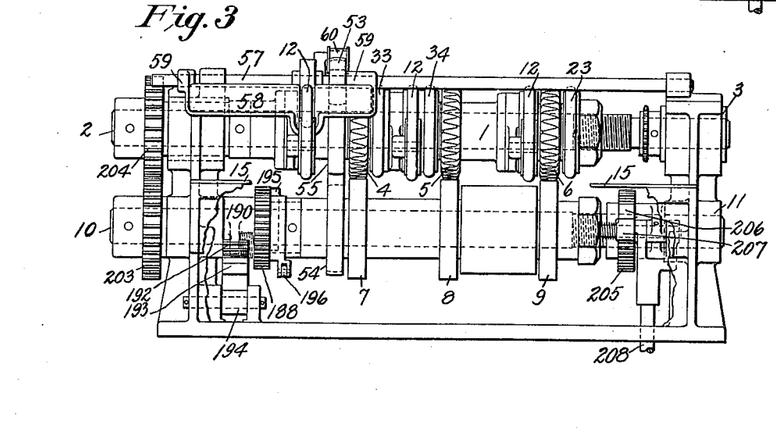
Fig. 3 is a rear elevation of the construction shown in Figs. 1 and 2.
Figure 4:
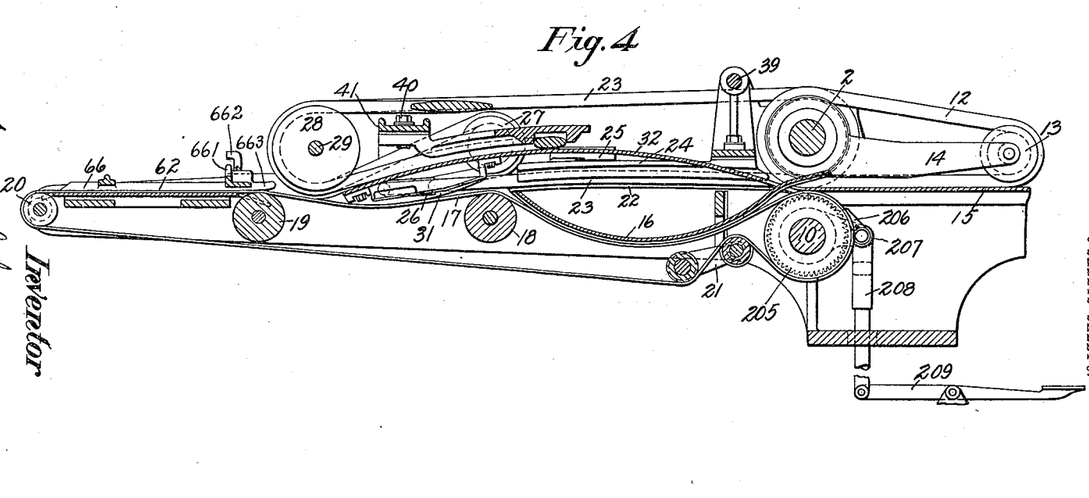
Fig. 4 is a section on the line 4—4 Fig. 1.
Figure 7:
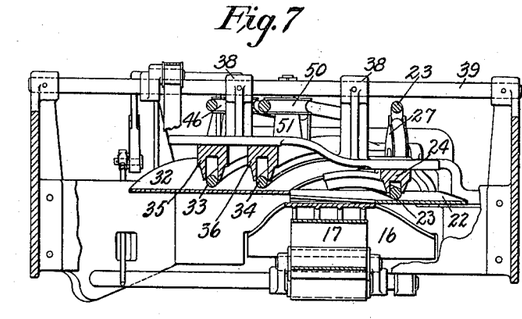
Figs. 7, 8 and 9 are cross-sections on the lines 7—7, 8—8 and 9—9 respectively of Fig. 1.
Figure 8:
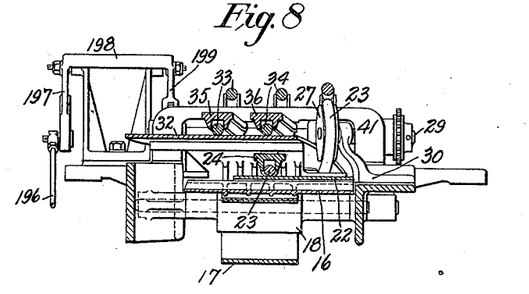
Figure 9:
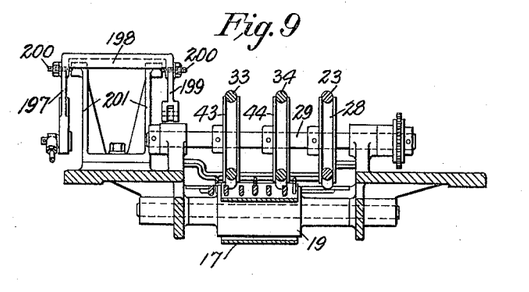

The particular machine illustrated is designed to cut what may be termed a main section or length of filler, that is, a section or length which is long enough to extend substantially from end to end of the bunch to be formed, and two forming sections or lengths. In this machine, the main section is cut by the cutters 5 and 6, and one of the forming sections by the cutters 4 and 5, the space between these cutters being shorter than that between the cutters 5 and 6. The other forming section is obtained from the tobacco which lies to the right of the cutter 6, as this cutter is seen in Fig. 3. In the operation of the machine, the operator will usually arrange a handful of leaves with the tips in register and place them within the range of action of the feeding belts 12, the leaves being so placed that a section of the proper length of the tip ends of the leaves will extend beyond or to the right of the cutter 6, as appears in Fig. 3. The operator will, of course, select filler leaves of the proper length to be fed to the machine, this being determined largely by the number of cuts to be made and the class of cigar to be made. After the filler lengths have been cut, they will be assembled by suitable mechanism. While this mechanism may vary, the construction shown produces a relative endwise movement between the lengths, this being accomplished by carrying the lengths through pathways which are arranged to converge in such a manner that the sections will be superposed. As illustrated, the length cut by the cutters 5, 6 will be forwarded through a pathway formed by a ribbed plate 16 with which coacts a belt 17, this belt being driven by a pulley on the shaft 10 and running over rolls 18, 19 and 20. From the roll 20, the return run leads back to the roll 10, the usual belt tightener 21 being employed, if desired. The short length cut off by the knife 6, this length lying, as before stated, to the right of this knife as seen in Fig. 3, is forwarded through a pathway formed by a plate 22 with which coöperates a round belt 23, this pathway being curved in toward the center of the machine, as indicated in Fig. 1. In order to cause the belt to follow this inward curve, a belt guide consisting of a curved channel plate 24 is employed, this channel plate being carried on a bracket 25 extending inward from the side frame of the machine. The belt 23, after leaving the belt guide, runs over a horizontal idler 26, then over an idler 27, after which it passes around a driving pulley 28, this pulley being mounted on a shaft 29 mounted in suitable bearings rising from the frame of the machine. The idler 27 (see Fig. 1) is mounted on a bracket 30 supported on the side frame of the machine. The pathway for the filler length cut by the knives 5, 6 has a downward dip, as indicated in Fig. 4, the plate 16 ending about abreast the guide roller 18 before referred to. From the end of this plate the tobacco is carried forward a short distance by the belt 17 alone. The guideway formed by the plate 22 and the belt 23 delivers its tobacco on the belt 17 at this point just above the roller 18. The two streams of tobacco are carried forward from this point by the belt 17 which here runs under a coöperating guide plate 31, this guide plate being carried by an upwardly curved guide plate 32 which forms one of the members of the pathway for the lengths cut by the knives 4, 5. The other member of this pathway consists of two belts 33, 34. This plate 32 is curved, as clearly seen in Fig. 7, and is supported by being secured to the frame, as indicated in Fig. 1. The belts 33, 34 are caused to curve inwardly so as to bring the tobacco forwarded by them and their coöperating guide into proper position to be united with the other two streams of tobacco referred to. This is accomplished by causing these belts to travel on their forwarding runs through curved channel guides 35, 36, indicated in dotted lines in Fig. 1, and best seen in cross section in Fig. 7. These channel guides are supported at one end by hangers 38 which depend from a cross bar 39, and at the other end by being secured by bolts 40 to a bridge bar 41 suitably supported on the frame. These bolts are located in slots 42 in the bridge bar so as to enable the channel guides to be adjusted. After leaving the ends of the channel guides 35, 36, the belts 33, 34 pass over pulleys 43, 44 mounted on the shaft 29 before referred to. After the belt 33 leaves the pulley 43, it returns to the shaft 2 passing around horizontal pulleys 45, 46, the pulley 46 being mounted on a standard 47 rising from the guide 35, and the pulley 45 being mounted on an arm 48 supported on this standard. The belt 34, after leaving the pulley 44 runs over horizontal pulleys 49, 50, the pulley 50 being supported on a standard 51 rising from the guide 36, and the pulley 49 being supported on an arm 52 extending from the standard 51. The pathway formed by the guide 32 and the belts 33, 34 delivers its tobacco onto the belt 17 at a point located, in the particular machine illustrated, about under the shaft 29. At this point, therefore, the three streams of tobacco which are advanced from the cutter are superposed, the end cuts formed by the knives 5, 6 and delivered by the pathway 16, lying on the belt 17, the short cut formed from the tobacco projecting beyond the knife 6 lying on the end cuts, and the third cut being superposed on the short cut. In other words, a mass of tobacco is formed consisting of a long length, a short length, and a longer third length, which length is, however, shorter than the long length.

Figure 5:
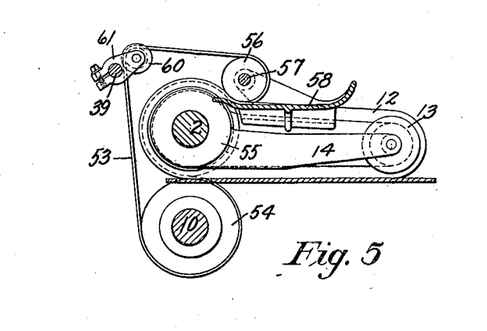
Fig. 5 is a detail section illustrating the construction of the device for disposing of the trimmings.

It may happen that some or all of the leaves subjected to the action of the cutting mechanism are longer than is necessary to form the lengths referred to, in which case the surplus tobacco will be trimmed off by the knife 4. While these trimmings may be disposed of in any desired way, in the particular construction shown, mechanism is provided for carrying the surplus, which will usually consist of short trimmings, to a point where it may be mingled, if desired, with the tobacco which enters between the cutters. In the particular construction illustrated, this disposal of the surplus trimmings is effected by providing a belt 53 which is driven by a pulley 54 on the shaft 10, the operating run of the belt (see Fig. 5) passing over a pulley 55 on the shaft 2 and then around an idle pulley 56 on a cross bar 57. On this bar 57 is mounted a casting 58 which is arranged to form a receptacle for the trimmings, this casting being supported by arms 59 (see Fig. 3). After leaving the pulley 56, the belt passes around an idler 60 supported in a bracket 61 mounted on the bar 39 and then returns around the pulley 54. By inspection of Figs. 1 and 5, it will be understood that the ends of the leaves which project beyond the knife 4 will be caught between the belt and the pulley 55, will be carried up around the pulley and into the receptacle 58. This receptacle is within easy reach of the operator and the trimmings can, if desired, be mixed by the operator with the stream of leaves which is being presented by the belts 12 to the cutting mechanism.

It is of course obvious that the filler cutting and assembling mechanism which has just been described might be used for cutting and preparing filler which will be stored in any suitable receptacle and used at any desired time. In the best constructions, however, this filler cutting and assembling mechanism will, as in the machine illustrated, form a part of an organized machine for making bunches or cigars. When the filler cutting and assembling mechanism is thus embodied in a machine for making cigars, the assembled filler may be transferred to the cigar forming mechanism in any desired way.

Figures 10, 11, 14, 15:
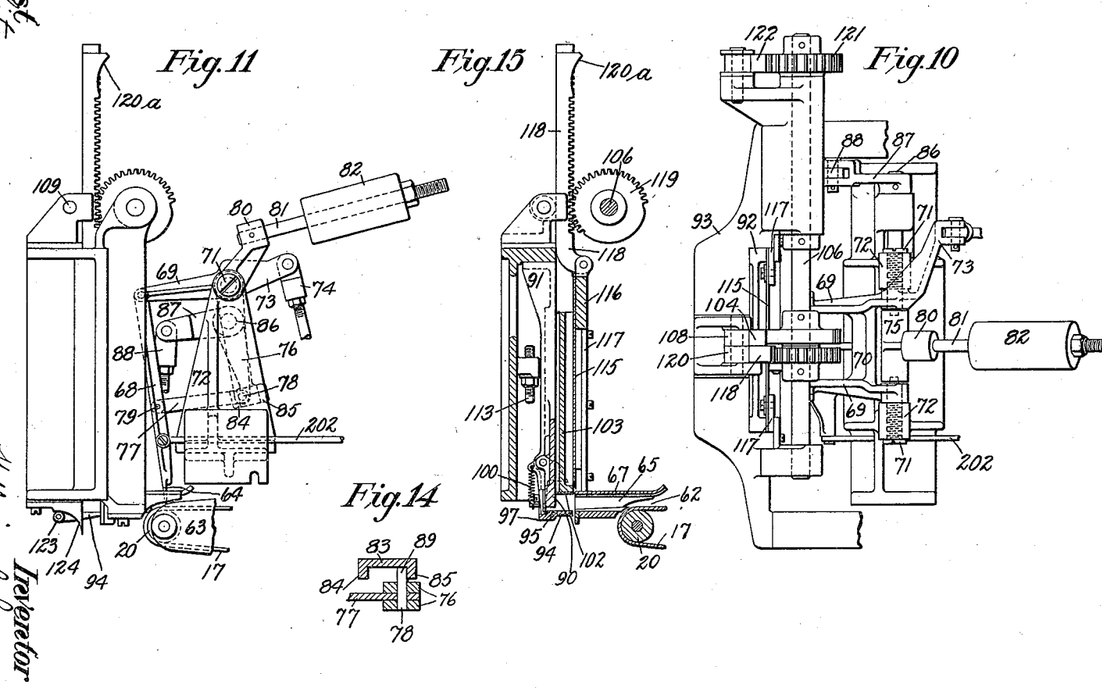
Fig. 10 is a plan view of the mechanism employed for forwarding the filler and charge carrier.
Fig. 11 is a side elevation of the construction shown in Fig. 10.
Fig. 14 is a detail sectional view illustrating a feature of the operating construction for the feeding device.
Figs. 15 and 16 are sections on the lines 15—15, 16—16 respectively of Fig. 12.

In the particular construction illustrated, the belt 17 before referred to runs through a forwarding channel indicated at 62 (see Figs. 1, 4 and 11), this channel being located in a casting 63 which projects forward from the frame of the machine and in which the shaft which carries the roller 20 is journaled. The roller 20 is so related with respect to the bunch or cigar forming or wrapping mechanism so as to enable the tobacco forwarded through the channel to be conveniently delivered in sections of proper size to the cigar wrapping mechanism. In the best constructions, there will be employed a forwarding mechanism which when the belt 17 is employed will coöperate with the belt in forwarding the tobacco to be delivered in sections of proper bulk to the cigar wrapping mechanism. While this forwarding mechanism may be varied in construction, it will, in the best constructions, embody means by which the tobacco in the channel may be subjected to a limited pressure only. It may be here remarked that in the particular machine shown, the channel delivers the tobacco to a carrier (which will be hereinafter described) by which it is transferred to the rolling mechanism, and it is desirable that the tobacco introduced into the carrier by the action of the forwarding means shall be of proper quantity and density to form a bunch. By using a forwarding device which is capable of exercising a limited pressure only upon the tobacco, the feeding action will stop when the proper amount of tobacco has been introduced into the carrier. Under some circumstances, it may happen that the tobacco will become densely packed in that part of the channel at or near the point where the feeding device begins to operate, in which case it might prevent the feeding device from beginning its movement. In the best constructions, therefore, means will be provided by which the limited pressure feeding device may, if necessary, have its movement begun under the influence of positively acting mechanism.

As illustrated, the feeding device embodies a set of forwarding fingers 64 which work through a short throat 65 which forms an extension of the channel 62 in which the belt 17 runs. The throat 65 may be flared slightly toward its delivery end. It may be here remarked, that, in order to confine the tobacco in the channel 62, the top thereof may be formed by a grid 66. The grid 66, in the particular construction shown, has a base piece 661 the ends of which extend beyond the sides of the grid and are hooked under hooks 662 mounted on the casting 63. The grid may have (see Fig. 4) short fingers or extensions 663 which extend back and overlie the roll 19, the tobacco stream being directed underneath the grid by this roll and the belt. That end of the grid next the roll 20 rests by its own weight on the tobacco stream and is free to have a slight vertical movement, if this be necessary, to accommodate the grid to any inequalities in the tobacco stream. The top of the throat 65 may be formed by a slotted plate or grid 67 through the slots of which the fingers 64 work. In the particular construction illustrated, these fingers 64 are mounted on an arm 68, this arm being pivoted to arms or extensions 69 which extend from a casting 70. This casting is supported by two threaded studs 71 mounted in standards 72 rising from the frame of the machine. The casting may be given a rocking movement by any suitable mechanism to cause the fingers to be engaged with and disengaged from the tobacco. In the particular construction shown, this is effected by providing the casting with a rearwardly extending arm 73 to which is secured a connecting rod 74 this rod leading to a suitable cam on one of the cam shafts of the machine.

The mechanism by which the feeding fingers, when this form of feeding device is employed, may be caused to exercise a limited pressure on the tobacco in the throat 65 may be widely varied. As shown, there is provided a casting 75, this casting being pivoted on a stud 71 before referred to and lying between the rear ends of the arms 69 before described. This casting 75 has a downwardly extending arm 76 to which is connected a push rod or bar 77, the connections being effected by means of a pin 78. The forward end of this push rod or bar is pivoted at 79 to the arm 68. This casting 75 has extending up from it a short arm or boss 80 in which is supported a weight carrying rod 81, an adjustable weight 82 being mounted on this rod. It will be understood that by adjusting the weight nearer to or farther from the casting, the leverage of the weight will be decreased or increased, as the case may be. It will be further understood that when this weight is free to act, it will, through the arm 76 before referred to, advance the feeding fingers along the channel, this advancing movement, however, being limited by the resistance of the tobacco in the channel or in the receiver to be hereinafter described. In other words, when the tobacco is compacted sufficiently to overcome the pressure of the weight on the fingers the feeding movement will cease.

As has been heretofore indicated, means are provided for giving the feeding fingers an initial starting movement when the pressure exercised by the weight is not sufficient to begin the movement of the tobacco through the channel 65. While the particular means employed may be varied, in the construction shown, there is provided an arm 83, this arm being in turn provided with lugs 84, 85 (see Fig. 14) and being pivoted on a short shaft 86 supported in one of the standards 72. This shaft 86 has an arm 87 extending therefrom, this arm having a cam actuated connecting rod 88 pivoted thereto. The pin 78 before referred to, by which the push rod 77 is connected to the arm 76, is elongated and its extending end or head 89 lies between the lugs 84, 85 before referred to. In the operation of this part of the mechanism, at the time when the feeding movement begins, the shaft 86 is actuated through the arm 87 and its connections to throw the lower end of the arm 83 forward or in the direction in which the feeding fingers are to move. At this time, the head of the pin will be resting against the lug 84. As the arm 83 moves forward, if the tobacco is not compacted in the receiver, the weight may come into action and the tobacco may then be fed by the feeding fingers, operated by the weight, until the tobacco in the receiver is properly compacted. The fingers are now lifted out of the channel by arms 68, 69, and 73, and cam connecting rod 74 and are returned by a reverse movement of the arm 83, the lug 84 striking the head 89 of the pin 78 and thus moving the arm 76 backward. The backward movement of the arm 76 rocks the casting 75 and raises the weight, so that when the fingers have again been caused to engage with the tobacco in the channel, another feeding movement will take place. In case, however, the tobacco is so compacted at the beginning of the throat 65 as to prevent the weight from actuating the fingers, the arm 83 will move forward until the lug 85 strikes the head 89 of the pin 78. As soon as this occurs, the fingers will be positively started and the movement may then be continued by the weight, or it may be continued by the arm 83 operating against the head 89 of the pin 78.

It will be understood that if the tobacco is not compacted in the channel the feeding fingers will be free to move a distance equal to the full movement of the arm 83. When the tobacco is so compacted in the channel that it cannot be moved by the weight the fingers will then be moved by the arm 83, but the distance which they will be moved will be less than the entire movement of the arm by the distance between the shoulders 84, 85. In other words, the maximum amount of movement which the fingers may have is equal to the movement of the arm 83, and the minimum amount of movement they may have is equal to the movement of the arm less the distance between the shoulders 84, 85. Between these two extremes the movement of the fingers may vary according to the degree of compactness of the tobacco in the channel.

Figure 12:
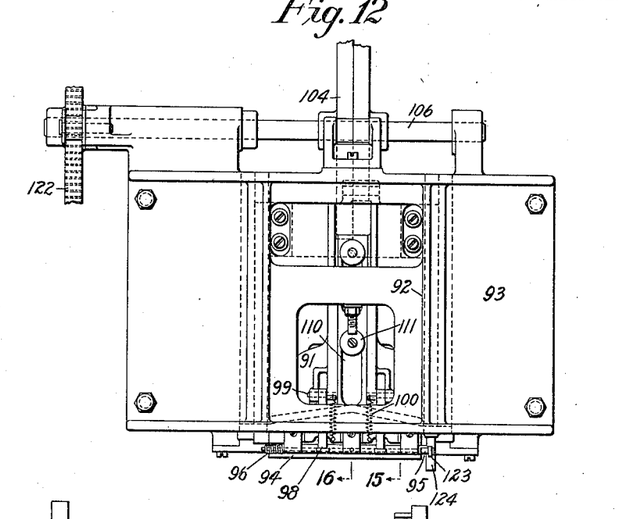
Figs. 12 and 13 are respectively front and rear elevations of the mechanism for disposing of the charges of tobacco in the rolling mechanism.
Figures 13, 16:
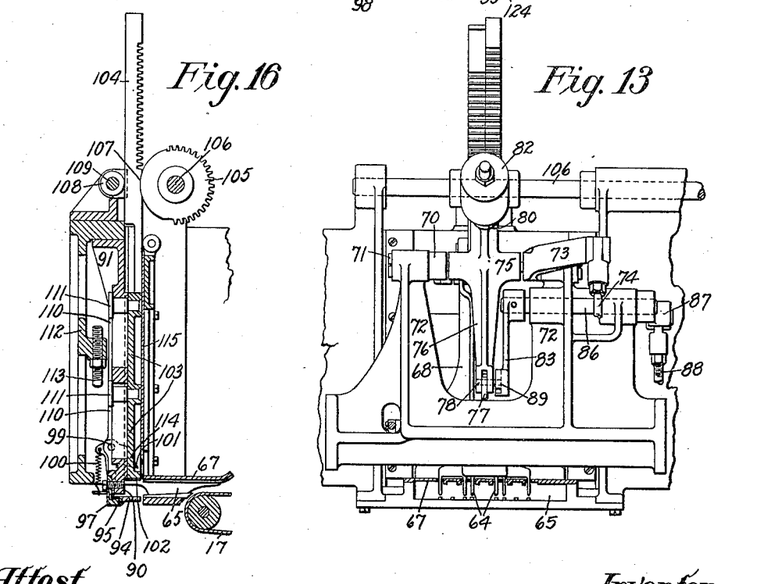
Figures 17, 18, 19:
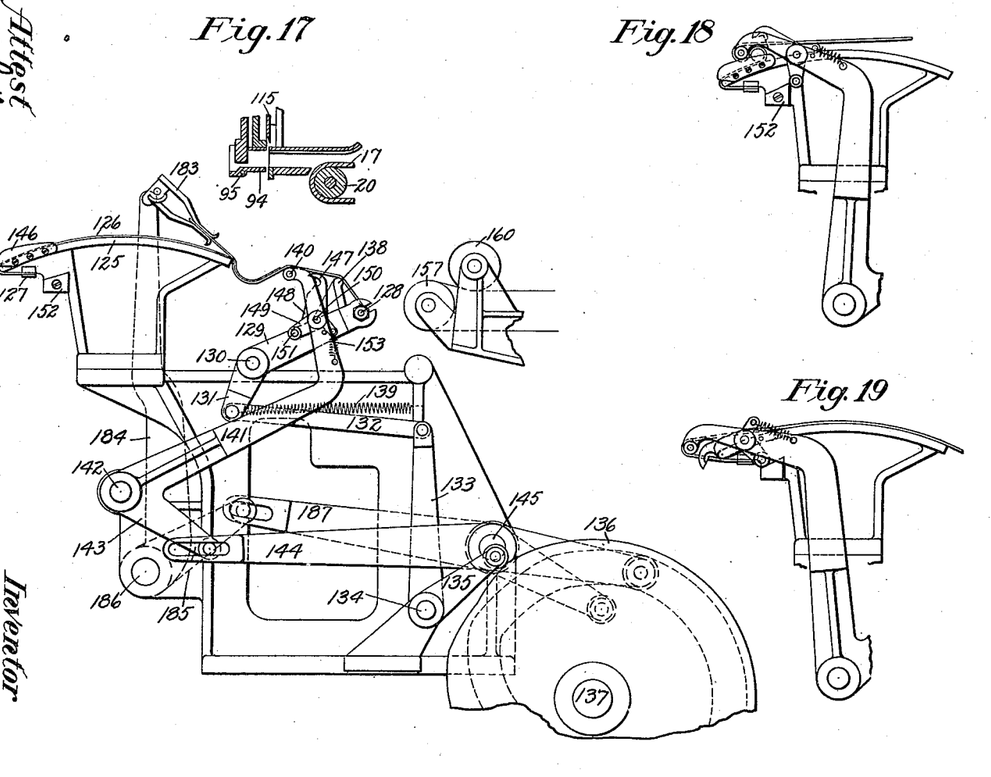
Fig. 17' is a rear perspective view illustrating in detail the mechanism shown in the lower parts of Figs. 15 and 16.
Figs. 18 and 19 are detail views illustrating the operation of the cutting mechanism for trimming the bunches.
Figures 20, 21, 22:
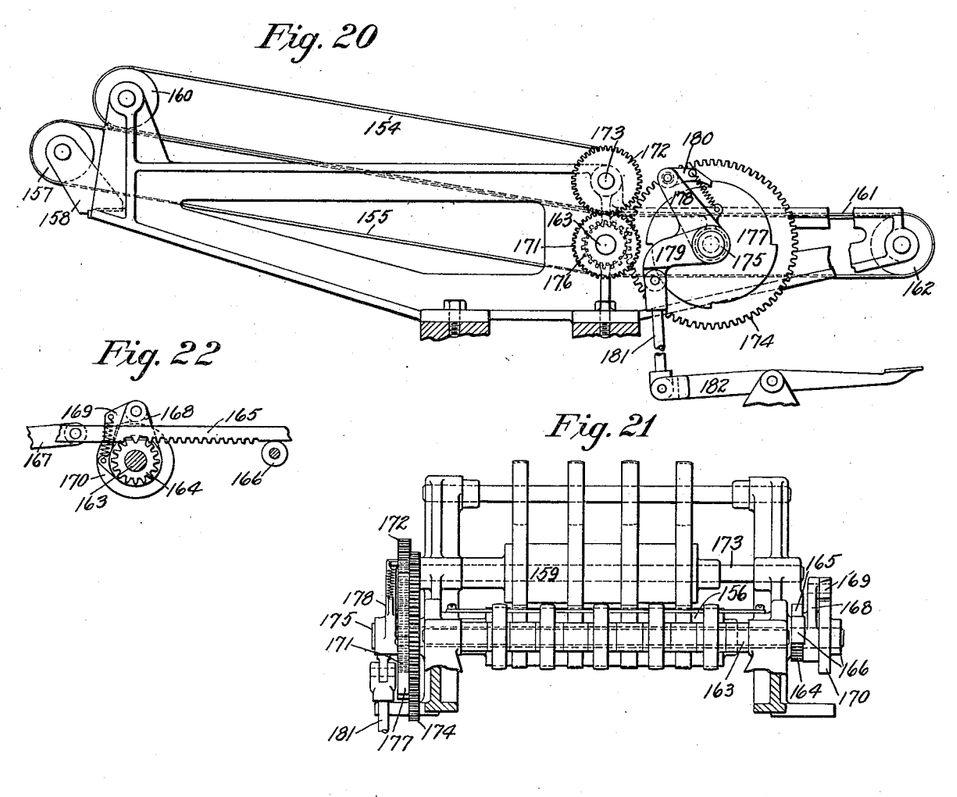
Fig. 20 is a side elevation of the binder feed employed.
Fig. 21 is a front elevation of the construction illustrated in Fig. 20, certain parts being removed.
Fig. 22 is a detail view illustrating some features of the driving mechanism for the binder feed.

The means by which sections of the advancing tobacco are separated from the mass forwarded by the feeding fingers and transferred to the rolling mechanism may be varied within wide limits. As shown, there is employed a receiver, the rear wall 90 of which is formed on a slide 91 which moves in guides 92 formed in a casting 93 which forms a part of the main frame of the machine. The bottom of the receiver is formed by a plate 94 which is pivoted in the slide 91 by a pintle rod 95 which extends along the plate. Normally, this plate 94 will occupy the position illustrated in Fig. 16, that is to say, it will close the bottom of the receiver, the plate being caused to take this position in any suitable manner, as, for instance, by a spring 96 (see Figs. 12 and 17') coiled around the pintle rod. In order to prevent the bottom from being forced open when the charge is introduced into the receiver, means are provided for locking it in its closed position. In the best constructions, these means will be of such a character as to hold it locked until it reaches its discharging position. While the locking means may be varied in construction, as shown, the plate 94 is provided with rearwardly extending tails 97 which are engaged by two locking dogs 98, these dogs being pivoted at 99 to the slide 91 and being actuated by springs 100 (see Figs. 12, 15, 16 and 17'). As the bottom swings into its closed position, the dogs are moved by their springs into position above the tails 97 and prevent any downward movement of the bottom as the charge is forced into the receiver until the dogs are positively disengaged from the tail.

While the disengaging means for the dogs may be varied, they are provided with forward extensions 101 which are, in the particular machine illustrated, operated from the charge ejector. While the details of construction of this charge ejector may be varied, as shown, it consists of a plate 102 mounted on a plunger 103. This plunger works in the guides 92 before referred to, these being the guides in which the slide 91 moves. This plunger may be operated by any suitable mechanism. As shown, it has formed in one piece with it a rack bar 104, this bar being arranged to be engaged by a segment 105 mounted on a shaft 106 suitably supported in bearings in the frame. For reasons, which will hereinafter appear, the segment 106 turns some little distance after its teeth have passed out of mesh with the rack bar, and in order to sustain the plunger in its elevated position, the rack bar is provided with a locking face which is slightly concave, indicated at 107, this being engaged by the untoothed face of the segment. The plunger is held forward against the segment by a guiding roller 108 mounted on a stud 109. In the operation of the mechanism, the slide 91 and the charge ejector move downward together until the charge receiver reaches its discharging position, at which time the slide 91 ceases to move and the ejector continues its movement. While the movement referred to will be effected in any desired way, as shown, the slide 91 is provided with slots 110, these slots being engaged by studs 111 which are carried on the plunger. The frame of the machine is provided with a cross web 112 in which is mounted an adjustable stop screw 113, this screw contacting with a cross web on the upper part of the slide, as is clearly apparent from Fig. 16. When the ejector is driven downward by the segment 105, therefore, the slide 91 descends with it until the screw 113 stops this movement. The ejector then continues its movement to eject the charge.

It has been heretofore stated that the plate 94 is positively locked in a closed position and before the charge can be delivered, this plate must, therefore, be unlocked. While this may be effected in various ways, in the construction shown, the forward extensions 101 are provided with cam faces which are struck by a cross web 114. This serves to rock the dogs 98 on their pivots which permits the plate to be rocked downward by the descending plunger.

Prior to the descent of the charge carrier, the charge in the carrier should be separated from the tobacco in the channel 65. In the particular construction illustrated, this is effected by a knife 115, this knife being carried on a slide comprising a cross web 116 and two vertical pieces 117, this slide moving in the ways 92 before referred to. The slide is actuated by a rack bar 118 to which the slide is jointed, this rack bar being operated by a segment 119 mounted on the shaft 106 before referred to. This rack bar is held up against the segment by means of a roller 120 mounted on the stud 109 before referred to. When the shaft 106 is rotated, the segment 119 first engages the rack 118 and drives down the knife 115, separating the charge in the carrier from the tobacco in the channel, after which the movements of the receiver and ejector before adverted to take place.

Should it be desired to stop the knife before the receiver completes its downward movement, this may be effected by providing the bar 118 with a concave locking face 120ª which will engage the untoothed part of the segment. It may be here remarked that the shaft 106 is provided with a gear 121 which is actuated at proper times by a rack bar 122 operated from a suitably located cam in the machine.

After the charge has been delivered from the charge carrier or receiver, the carrier returns to its position opposite the mouth of the channel 65. While the coiled spring 96 referred to might be relied on to restore the plate 94 to its closed position, in the construction illustrated, additional means are employed for this purpose. As shown, these means comprise a roller 123 (see Figs. 11, 12 and 17') mounted on an arm 123' secured to the end of the pintle 95 (see Fig. 17'), this roller engaging a cam projection 124 secured to the under side of the frame 93. As the plate 94 comes into its closed position, the dogs 98 snap in under the stress of their springs and lock it.

The charge carrier delivers to a rolling mechanism, the construction of which may be varied within wide limits. That shown is, generally speaking, of the ordinary Chianti belt type, that is to say, it consists of a table 125 with which coöperates a rolling apron 126, one end of this apron being secured to a bracket 127 on the table. The other end of this apron is secured to a cross rod 128 carried in arms 129, these arms being mounted on a shaft 130. This shaft has an operating arm 131 secured to it, this arm being connected by a link 132 to another arm 133 mounted on a shaft 134. This shaft 134 has an operating arm 135 attached to it which runs on a cam 136 mounted on one of the cam shafts 137 of the machine. The belt before being secured to the rod 128 runs over a guiding rib 138 mounted on the arms 129. The system of levers which has just been described operates to allow a little slack to be formed in the belt just prior to the rolling of the bunch, this slack being produced by a movement of the lever system which is effected by a spring 139, the taking up of the slack after the discharge of the bunch being positively effected by the movement of the lever system produced by the cam 136.

The rolling of the bunch in the apron or belt is effected by means of a loop forming roller 140 carried in bent arms 141, these arms being keyed or otherwise secured to a shaft 142 suitably supported in the frame of the machine. One of the arms has formed in one piece therewith an operating arm 143 which is connected to an operating lever 144 pivoted on a cross bar 145, this lever being actuated by a cam of suitable configuration on the shaft 137.

It is customary to trim one or both ends of the bunch either during or after rolling. While this trimming may be effected by various means, in the best constructions, it will be effected by a trimming mechanism at least one member of which moves with the loop forming member, that is, in the construction illustrated, the roll 140. The construction of these trimming means may be varied widely. In the construction shown, both ends of the bunch are trimmed during the last part of the rolling operation or at about the time when the rolling operation is completed. This is effected by providing the table 125 with a pair of knives 146, these knives being screwed or otherwise secured to the edges of the table. Coöperating with these knives are knives 147, these knives being mounted on bell-crank levers 148, 149 which are pivoted at 150 to the arms 141. The arms 149 of the bell-cranks are provided with cam rollers 151 which, as the arms 141 swing over and the rolling operation is about to be completed, strike against cams 152 secured to the frame which carries the rolling table. These cams operate the bell-crank levers, this throwing the knives 147 down, these knives in connection with the knives 146 effecting the trimming of the bunch. As the arms 141 return, the knives 147 are restored to position by suitable springs, as 153.

The wrappers or binders for the bunches in the rolling mechanism may be supplied in various ways. In the particular construction illustrated, the binders are automatically supplied. When the binders are automatically supplied to the rolling mechanism, the particular construction may be varied, but in the best constructions, the binder supply mechanism will be of such a character as to support a plurality of binders which are successively brought into position to be delivered to the rolling mechanism. In the particular construction illustrated, the binder supplying mechanism embodies a plurality of upper belts 154 and a plurality of lower belts 155. The belts 155 run over the main roll 156 which may be roughened, in order to give the belts a grip thereon, and over an idle roll 157 mounted in brackets 158 extending from that part of the frame of the machine which supports the binder feed. The belts 154 run over a main driven roll 159 and over an idle roll 160 mounted in bearings in the frame. The binders may be presented to the binder carrying belts 154, 155 in any desired way. In the construction shown, this is effected by laying the binders on forwarding tables or belts 161 which belts pass around the roll 156 and around an idle roll 162 suitably supported in the frame. When the binder carrier includes belts, it may be operated in any desired way. In the particular construction shown, however, two sets of means are provided for operating the belts, one set being entirely automatic and the other set being under the control of the operator. In order to automatically drive the belts, the shaft 163 which supports the roll 156 is provided at one end with a gear 164, this gear being loose on the shaft. This gear is in mesh with a sliding rack 165 which is supported on a roller 166 mounted on the frame and is operated by a connecting rod 167 which is operatively connected with one of the cam shafts of the machine, as, for instance, the shaft 137 referred to. The hub of the gear 164 is provided with a pawl carrying arm 168, this arm supporting a spring controlled pawl 169 which when the gear is turned in one direction coöperates with a one toothed ratchet 170 fast to the shaft 163. This form of driving means, which is well-understood in the art, causes the shaft to be turned when the rack is moving in one direction and allows the gear 164 to run loose on the shaft when the rack is running in the opposite direction. The shaft 163 is provided on the end opposite to that which carries the gear 164 with a gear 171 which meshes with a gear 172, this gear being mounted on the shaft 173 which supports the roll 159. The driving means which is under the control of the operator, comprises, in the particular construction shown, a gear 174 mounted on a stud 175 suitably supported in the frame, this gear being in mesh with a gear 176 on the shaft 163. The stud 175 also supports a ratchet wheel 177 which is fast to the gear 174 and a two-armed pawl carrier 178, 179. The arm 178 supports a spring controlled pawl 180 and the arm 179 is connected by a rod 181 to a treadle 182. Should the operator, for any reason, miss a feed at the proper time, the binder carrying belts may be given additional movements by the mechanism last referred to, or it may be used to bring the binders into proper position when the machine is started.

The binder feeding mechanism shown includes a binder transferring device by which the binders are taken from the belts and transferred to the wrapping mechanism. As illustrated, this mechanism consists of a set of gripper fingers 183 mounted on a swinging arm 184, this arm forming a part of a bell-crank lever 184—185 pivoted on a stud 186 suitably supported in the frame of the machine. The arm 185 is operated from a lever 187, this lever being pivoted on the bar 145 and being actuated from a cam on the shaft 137. Suitable means will be provided for opening and closing the grippers. Such means are, however, well-known to those skilled in the art and illustration and description of them are omitted for the sake of brevity.

Figure 2:
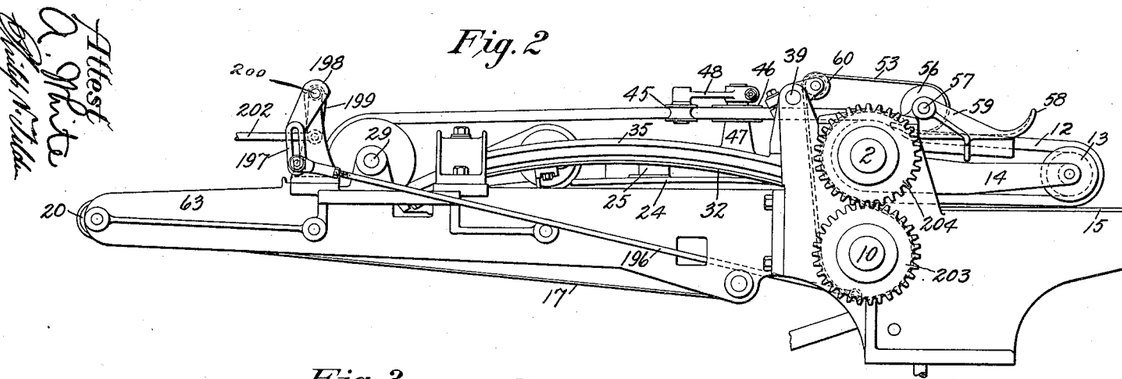
Fig. 2 is a side elevation of the construction shown in Fig. 1.
Figure 6:
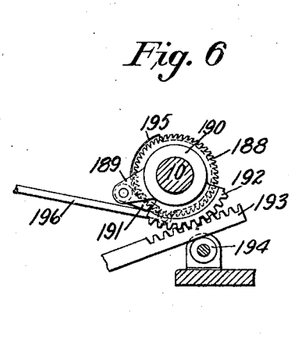
Fig. 6 is a detail section illustrating part of the driving mechanism.

The means by which the filler cutting mechanism hereinbefore described is operated may be varied widely. In the best constructions, however, this driving means will include connections to the means for advancing or delivering the filler to the charge receiver, so that the amount of filler cut and carried forward to the advancing or delivering means depends upon the amount forwarded or delivered by them. While this may be accomplished in various ways, in the particular construction shown, the shaft 10 which carries the collars 7, 8 and 9 which coöperate with the knives 4, 5 and 6 is provided with a ratchet wheel 188 fast on the shaft. Coöperating with this ratchet wheel is a pawl carrier 189, the hub 190 of which is loosely supported on the shaft 10, as is clearly shown in Fig. 6. This pawl carrier is provided with a pawl 191 and the hub 190 also supports a toothed segment 192, there being in mesh with this segment a rack 193 which is supported on a roll 194 mounted in the frame. This rack 193 is driven by suitable connections, not shown, from one of the cam shafts of the machine. Loosely mounted on the shaft 10 is a shield 195, this shield having secured to it a connecting rod 196 (see Figs. 2 and 6) which rod is secured in a slotted arm 197. This arm is connected by a cross web 198 to a second operating arm 199, these arms being supported by screws 200 having bearings in standards 201 rising from the frame of the machine. To the arm 199, there is secured a connecting rod 202, this rod (see Fig. 11) being connected to the arm 68 which carries the feeding fingers 64. It is apparent that as the stroke of the feeding fingers varies, the shield 195 will, through the connections just described, be shifted varying distances, so as to present more or less of the teeth on the ratchet 188 to the pawl 191. The take of the pawl and consequently the amount of circumferential movement given the shaft 10 will, therefore, vary according as the stroke of the feeding fingers is greater or less. The shaft 10 is provided with a gear 203 which is in mesh with a gear 204 on the shaft 2. The amount of cutting movement and the amount of filler cut will, therefore, be governed directly by the amount of filler forwarded by the feeding fingers.

Means may be provided, under the control of the operator, so that, for instance, the operator may operate the filler cutting mechanism independent of the other parts of the machine in order to cut in advance a certain amount of filler in getting the machine ready to start up, or for other reasons. This additional operating mechanism may be of any suitable character. As shown, the shaft 10 is provided on the end opposite to that which carries the ratchet 188 with another ratchet 205 with which coöperates a pawl 206, this pawl being mounted on a pawl carrier 207 loosely supported on the shaft 10. This pawl carrier is operated, through a connecting rod 208, from a treadle 209.

Changes and variations may be made in the construction by which the invention is carried into effect. The invention is not, therefore, to be confined to the particular construction herein described and shown.

What is claimed is:—

1. In a filler preparing mechanism, the combination with means for dividing tobacco into sections, of means for causing a relative endwise movement to take place between the sections whereby they are assembled.

2. In a filler preparing mechanism for cigar machines the combination with means for cutting filler into different lengths, of means for assembling the lengths into a mass.

3. In a filler preparing mechanism for cigar machines, the combination with a rotary cutting mechanism constructed to cut the filler into different lengths, of means for superposing the lengths.

4. In a filler preparing mechanism for cigar machines, the combination with a rotary cutting mechanism operating to cut filler into different lengths, of means for presenting filler tobacco thereto, and means for assembling the lengths.

5. In a filler preparing mechanism, the combination with a cutting mechanism constructed to cut filler lengths, of means for presenting tobacco leaves sidewise to the cutting mechanism, and independent pathways for receiving the lengths after cutting.

6. In a filler preparing mechanism, the combination with a cutting mechanism constructed to cut filler lengths, of means for presenting tobacco leaves sidewise to the cutting mechanism, and independent converging pathways for receiving the lengths after cutting.

7. In a filler preparing mechanism for cigar machines, the combination with a filler cutting mechanism arranged to cut filler into different lengths, of independent pathways through which the lengths are forwarded from the cutting mechanism.

8. In a filler preparing mechanism for cigar machines, the combination with a filler cutting mechanism arranged to cut filler into different lengths, of independent converging pathways through which the lengths are forwarded from the cutting mechanism.

9. The combination with a filler cutting mechanism constructed to cut a main section of filler and two forming sections, of means for superposing the sections.

10. The combination with a rotary filler cutting mechanism constructed to cut a main section of filler and two forming sections, of means for superposing the sections.

11. The combination with a rotary filler cutting mechanism arranged to cut a main section and two forming sections of filler, of means for presenting the filler thereto, and means for superposing the sections after cutting.

12. The combination with a cutting roll provided with two knives spaced so as to cut a main filler section and two forming sections, of a coöperating cutting device, and means for assembling the sections.

13. The combination with a cutting roll provided with two knives spaced so as to cut a main filler section and two forming sections, of a coöperating cutting device, means for presenting the filler to the rolls, and means for assembling the sections.

14. The combination with a roll provided with three knives shaped to present salient and reëntrant angles and spaced to cut a main section and two forming sections, of means for assembling the sections, and a coöperating cutting device.

15. The combination with a roll provided with three knives shaped to present salient and reëntrant angles and spaced to cut a main section and two forming sections, of means for presenting filler tobacco thereto, a coöperating cutting device, and means for assembling the sections.

16. The combination with a filler cutting mechanism constructed to cut filler into different lengths, of belts and guides arranged to form independent pathways for the lengths.

17. The combination with a filler cutting mechanism constructed to cut filler into different lengths, of belts and guides arranged to form independent converging pathways for the lengths.

18. The combination with a rotary filler cutting cylinder provided with a plurality of knives at least one of which is formed to present salient reëntrant angles, the knives being arranged to cut filler into different lengths, coöperating cutting means, and converging pathways for the lengths.

19. The combination with a rotary filler cutting cylinder provided with a plurality of knives at least one of which is formed to present salient and reëntrant angles, the knives being arranged to cut filler into different lengths, coöperating cutting means. means for presenting the filler tobacco to the cylinder, and converging pathways for the lengths.

20. The combination with a cutting mechanism arranged to cut filler into different lengths, of means for assembling the lengths, and means for collecting the waste trimmings.

21. The combination with a cutting mechanism arranged to cut filler into different lengths, of means for presenting filler tobacco thereto, means for superposing the cut lengths, a receptacle for trimmings adjacent to the filler presenting means, and means for transferring the trimmings to the receptacle.

22. In a cigar machine, the combination with means for cutting and superposing filler lengths to form a mass of filler, of a rolling mechanism, and means for transferring sections of the mass to the rolling mechanism.

23. In a cigar machine, the combination with a rolling mechanism, of means for cutting filler into different lengths, means for assembling the different lengths into a mass, and means for transferring sections of the mass to the rolling mechanism.

24. In a cigar machine, the combination with a rolling mechanism, of means for cutting and assembling filler of different lengths into a mass, means for transferring the sections of the mass to the rolling mechanism, and means for automatically presenting wrappers to the rolling mechanism.

25. In a cigar machine, the combination with a rolling mechanism, of filler cutting mechanism by which a mass of filler is provided, means for delivering sections of the mass to the rolling mechanism, and means for controlling the operation of the cutting mechanism from the delivery means.

26. In a cigar machine, the combination with a rolling mechanism, of cutting mechanism by which filler is provided in a mass to be delivered to the rolling mechanism, a delivery means, and connections between the delivery means and the cutting mechanism whereby the speed of the cutting mechanism is controlled by the delivery means.

27. The combination with a rolling mechanism employing a table and a belt, of a loop forming member coöperating with the belt, means for moving the loop forming member over the table, a knife carried by the moving means, a coöperating knife on the table, and means for giving one of the knives a cutting movement as the rolling operation is completed.

28. The combination with a rolling mechanism employing a table and a belt, of a loop forming member coöperating with the belt, means for moving the loop forming member over the table, a knife carried by the moving means, a coöperating knife on the table, and means for giving the knife which is carried on the moving means a cutting movement as the rolling operation is completed.

29. The combination with a rolling mechanism employing a table and a belt, of a loop forming roll coöperating with the belt, swinging arms for moving the roll over the table, a lever mounted on one of the arms, a knife on the lever, a coöperating knife on the rolling table, and means as a cam in the path of the lever on the arms for giving the knife a cutting movement as the rolling operation is completed.

30. The combination with a rolling mechanism, of a binder carrier operating to support a plurality of binders, a binder transferring device for transporting the binders from the carrier to the rolling mechanism, automatic means whereby the binder carrier is moved to present the binders to the transferring device, and means under the control of the operator for also moving the binder carrier.

31. The combination with a rolling mechanism, of a binder carrier employing a plurality of belts arranged to support a plurality of binders, a transferring device, and automatic means for moving the belts to bring the binders within the range of action of the transferring device, and means under the control of the operator for also moving the belts.

32. The combination with a charge receiver, of means for depositing the charges of tobacco therein, said means including a feeding device, means controlled by the density of the charge for producing a feeding movement of said devices, and means whereby said devices may be given a positive feeding movement.

33. The combination with a charge receiver, of a feeding channel leading thereto, feeding fingers working in the channel, means controlled by the density of the charge for giving the fingers a feeding movement, and means whereby the fingers may be given a positive feeding movement.

34. The combination with a charge receiver, of a feeding channel leading thereto, feeding fingers working in the channel, a weight and suitable connections for giving the fingers a feeding movement, and means whereby the fingers may be given a positive feeding movement.

35. The combination with a charge receiver, of a feeding channel leading thereto, feeding fingers operating in said channel, a push bar, weight operated means for giving the bar a feeding movement, and means whereby the push bar may be given a positive feeding movement.

36. The combination with a rolling mechanism, of a charge receiver having a movable bottom, a tobacco feeding channel, means for reciprocating the receiver between the rolling mechanism and the mouth of the channel, feeding means for forcing the tobacco into the receiver, means for separating the charge in the receiver from the tobacco in the channel, a charge ejector, positive locking means including a pivoted locking dog for the receiver bottom, means operated by the charge ejector for actuating the dog to unlock the bottom, and means for restoring the bottom and dog to locked position after the ejector has operated.

37. The combination with a rolling mechanism, of a charge receiver having a movable bottom, a tobacco feeding channel, means for reciprocating the receiver between the rolling mechanism and the mouth of the channel, feeding means for forcing the tobacco into the receiver, means for separating the charge in the receiver from the tobacco in the channel, a charge ejector, positive locking means including a pivoted locking dog for the receiver bottom, a cam operated from the ejector to release the dog to unlock the bottom, and means including a suitable cam and spring for returning the dog and bottom to locked position after the ejector has operated.

In testimony whereof, I have hereunto set my hand, in the presence of two subscribing witnesses.

WILLIAM S. LUCKETT.

Witnesses:
J. W. SLAUGHTER,
W. BEAUFORT BELL.

---

Copies of this patent may be obtained for five cents each, by addressing the "Commissioner of Patents, Washington, D. C."